March 23, 1926.  
W. RUPPEL ET AL  
1,577,660
PROCESS FOR THE ELECTROOSMOTIC PURIFICATION OF GLUE AND GELATIN
Filed March 13, 1924
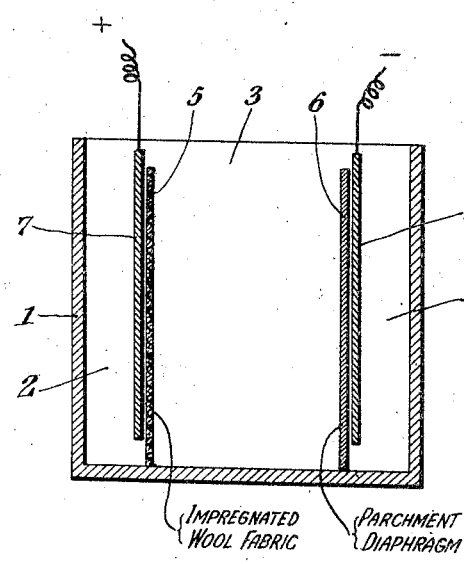
Wilhelm Ruppel and Kuno Wolf INVENTOR.
BY Ward, Crosly & Smith ATTORNEYS.

Patented Mar. 23, 1926.

1,577,660

UNITED STATES PATENT OFFICE.

WILHELM RUPPEL, OF BERLIN, AND KUNO WOLF, OF BERLIN-CHARLOTTENBURG, GERMANY, ASSIGNORS, BY MESNE ASSIGNMENTS, TO AMERICAN ELECTRO-OSMOSIS CORPORATION, OF NEW YORK, N. Y., A CORPORATION OF DELAWARE.

PROCESS FOR THE ELECTROOSMOTIC PURIFICATION OF GLUE AND GELATIN.

Application filed March 13, 1924. Serial No. 699,153.

*To all whom it may concern:*

Be it known that we, WILHELM RUPPEL and KUNO WOLF, a citizen of Germany and a subject of Holland, respectively, residing at Berlin, Schillstrasse 2, and Berlin-Charlottenburg, Kantstrasse 85, Germany, respectively, have invented certain new and useful Improvements in Processes for the Electroosmotic Purification of Glue and Gelatin, of which the following is a specification.

The invention relates to improvements in processes and apparatus for purifying glue or gelatin by an electric-osmotic method and consists in conducting the purification between suitable diaphragms which divide the electro-osmotic cell into three compartments with the material to be treated in the middle compartment whereby the diaphragms separate the material from the electrodes in the end compartments. The practical application of this process, however, involves a number of difficulties. On the one hand, cathodic or anodic migration of water produces an undesirable dilution of the solution of glue or gelatin contained in the central compartment of the three- or multicompartment cell. The dilution involved in this process produces changes in the concentration which have a marked detrimental effect on the electro-chemical procedure. On the other hand, both on account of the dimensions of the pores and the electric charge of the diaphragms employed, the valuable colloidal substances migrate into the side chambers containing the electrodes. This loss of material is increased by diffusion at the surfaces of the diaphragms, whether or not current is passing.

According to this invention in its preferred form all of the above disadvantages are overcome and the process is made most efficient by the use of special diaphragms which separate the glue, gelatin or the like from the electrodes of the electro-osmotic cell between which diaphragms the glue, gelatin or the like is placed to be purified by the current passing therethrough from one electrode to the other. It is impracticable to select quite empirically from the large number of possible combinations of diaphragms that combination which is most suitable for the process in question.

Further and more specific objects, features and advantages will more clearly appear from the following description taken in connection with the accompanying drawing which forms a part of this specification. The drawing is a vertical section through an electro-osmotic cell adapted for carrying out the invention.

Referring to the drawing 1 represents a suitable container divided into three compartments 2, 3 and 4 by semi-permeable diaphragms 5 and 6. In the compartment 2 is placed an anode 7 and in the compartment 4 is placed a cathode 8, while the glue or gelatinous solution to be treated is placed in the middle compartment 3. Suitable electrolyte such as ordinary water or water with a small amount of electrolyte, is placed in the electrode compartments 2 and 4. Upon passage of a suitable electric current between the electrodes, impurities are carried from the solutions in the middle compartment to the electrodes in the electrode compartments.

By the present invention, arising from the observation that the diaphragms exert an influence on each other's action in an electric field, the electro-osmotic purification of glue or gelatin can be carried out in a manner which is free from the above-mentioned defects by using an anodic diaphragm of wool fabric impregnated with chromated gelatin and a cathodic diaphragm of parchment.

The anodic diaphragm may be prepared as follows:—30 grams of gelatin are dissolved in 170 c. c. of water maintained at about 50° C. on the water bath; when it is in solution, 3 grams of finely powdered potassium bichromate are added, and when this has dissolved, are added 30 c. c. of gycerin. A closely-woven, but thick woolen fabric (stretched on a frame) is coated on both sides with a thin layer of the solution so obtained and exposed to sunlight until the yellowish-brown colour has become green. The coating of the fabric and its exposure to light are carried out in all three times.

For the cathode diaphragm, commercial parchment can be used.

While we have described our improvements in detail and with respect to preferred forms, we do not desire to be limited to such details or forms since many changes and modifications may be made and the improvements embodied in widely different forms without departing from the spirit and scope of the invention in its broader aspects. Hence we desire to cover all equivalents and all other modifications and forms coming within the language or scope of any one or more of the appended claims. What we claim as new and desire to secure by Letters Patent, is:

1. The process of purifying glue, gelatin and the like which consists in submitting an aqueous solution thereof to the action of an electric current with the solution separated from the electrodes by diaphragms, the anodic diaphgram being of wool fabric impregnated with chromated gelatin and the cathodic diaphragm being of parchment.

2. The process of purifying glue, gelatin and the like which consists in submitting an aqueous solution thereof to the action of an electric current with the solution separated from the electrodes by diaphragms and one of the diaphragms being of fabric.

3. An electro-osmotic cell having an anode compartment and a cathode compartment and an intermediate compartment for the material to be treated, the intermediate compartment being separated from the electrode compartments by semi-permeable diaphragms, the anodic diaphragm being of wool fabric impregnated with gelatin.

4. An electro-osmotic cell having an anode compartment and a cathode compartment and an intermediate compartment for the material to be treated, the intermediate compartment being separated from the electrode compartments by semi-permeable diaphragms, the cathodic diaphragm being of parchment.

5. An electro-osmotic cell having an anode compartment and a cathode compartment and an intermediate compartment for the material to be treated, the intermediate compartment being separated from the electrode compartments by semi-permeable diaphragms, the cathodic diaphragms being of parchment and the anodic diaphragm being of wool fabric impregnated with chromated gelatin.

In testimony whereof we affix our signatures.

PROF. WILHELM RUPPEL.
DR. ING. KUNO WOLF.